4 Sheets--Sheet 1.

W. R. KING.

Rock-Drill.

No. 6,716.

Reissued Oct. 26, 1875.

*Witnesses:*
Henry Eichling.
B. S. Clark

*Inventor.*
W. R. King
By J. P. Teich
his Atty.

4 Sheets--Sheet 2.

W. R. KING.
Rock-Drill.

No. 6,716.

Reissued Oct. 26, 1875.

*Witnesses:*
Henry Eichling
B. S. Clark

*Inventor:*
W. R. King
By J. P. Lick
his Atty

W. R. KING.

Rock-Drill.

No. 6,716.

Reissued Oct. 26, 1875.

*Witnesses:*

Henry Eichling.

B. F. Clarke

*Inventor.*

W. R. King

By J. P. Lich his Atty

4 Sheets--Sheet 4.

W. R. KING.
Rock-Drill.

No. 6,716.

Reissued Oct. 26, 1875.

*Section on 1.2.*

*Witnesses:*
Henry Eichling.
B. J. Clark.

*Inventor:*
W. R. King
By J. P. Stich
his Atty.

UNITED STATES PATENT OFFICE.

WILLIAM R. KING, OF UNITED STATES ARMY.

IMPROVEMENT IN ROCK-DRILLS.

Specification forming part of Letters Patent No. 53,305, dated March 20, 1866; reissue No. 6,716, dated October 26, 1875; application filed September 21, 1875.

*To all whom it may concern:*

Be it known that I, W. R. KING, Lieutenant United States Engineers, United States Army, have invented a certain Improvement in Machines for Drilling Rocks, of which the following is a specification:

My invention relates to structures for supporting rock-drills in variable positions; and it consists of a tripod, of wood or iron, having telescopic legs hinged at the top, and supporting mechanism for guiding and centering a reciprocating drill-bar with devices for confining the swinging leg or legs at prescribed points, and devices for attaching heavy weights to the legs, for the purpose of giving stability to the structure when the machine is in operation.

Figure 1:
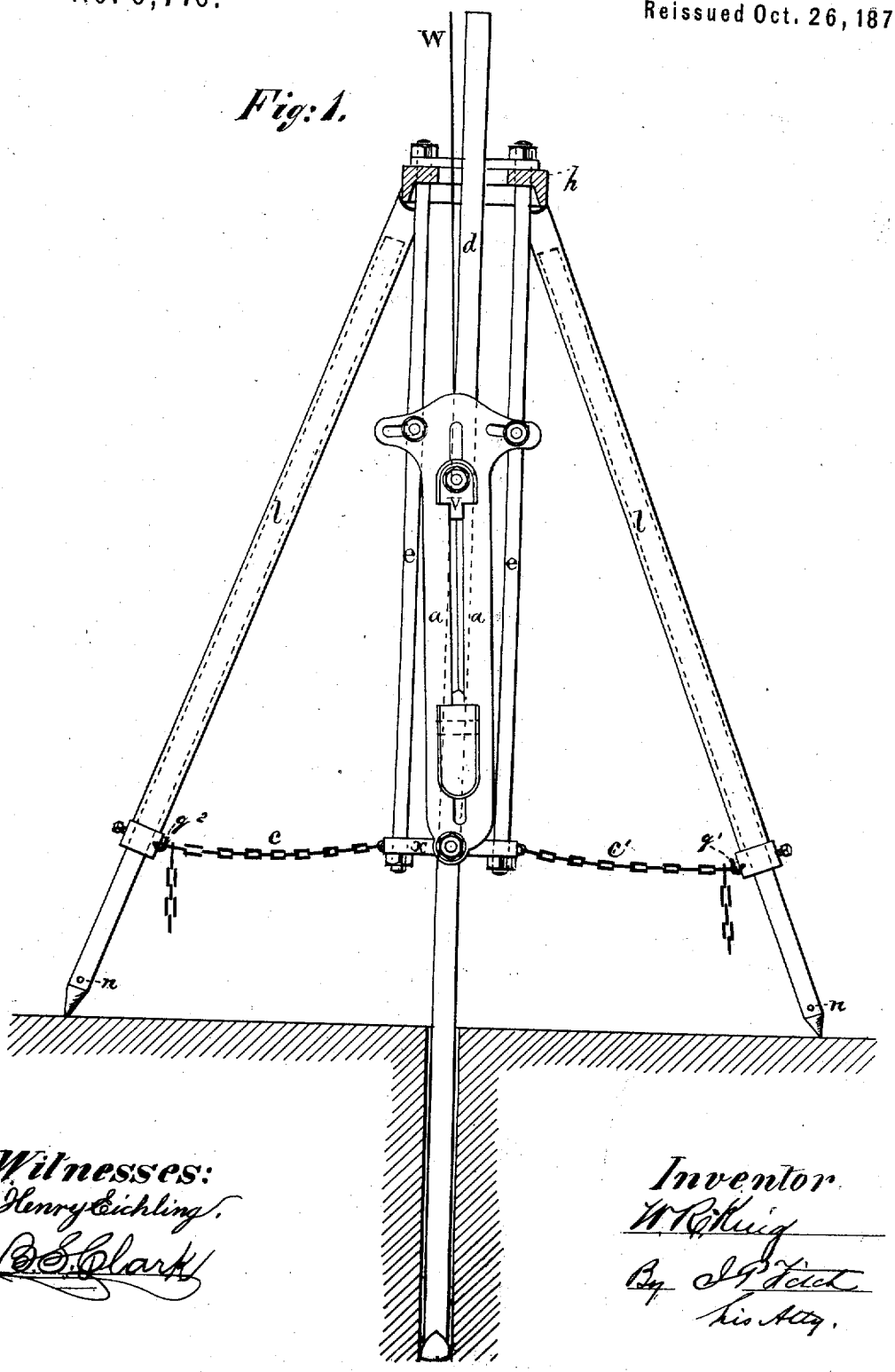
Figure 2:
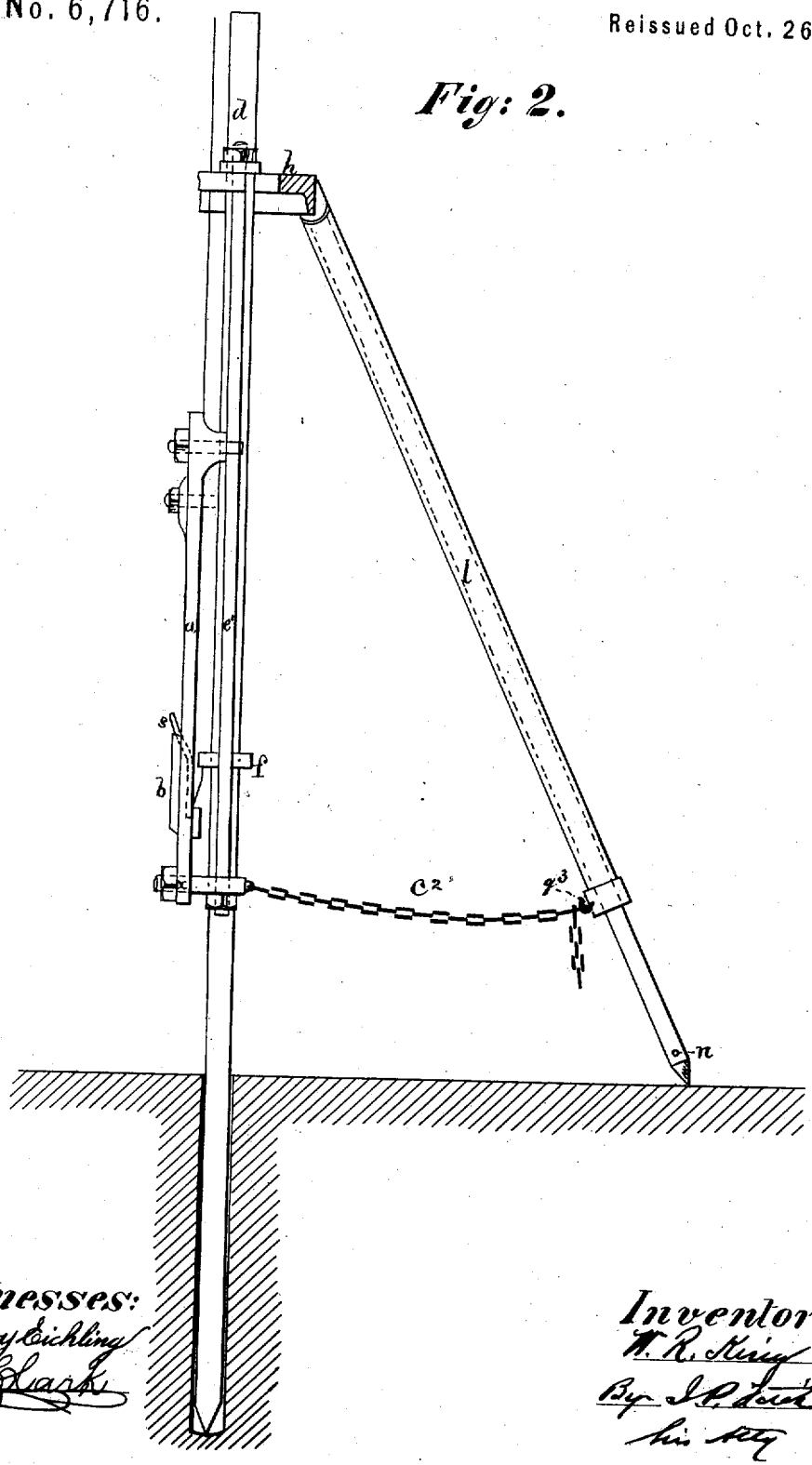
Figure 3:
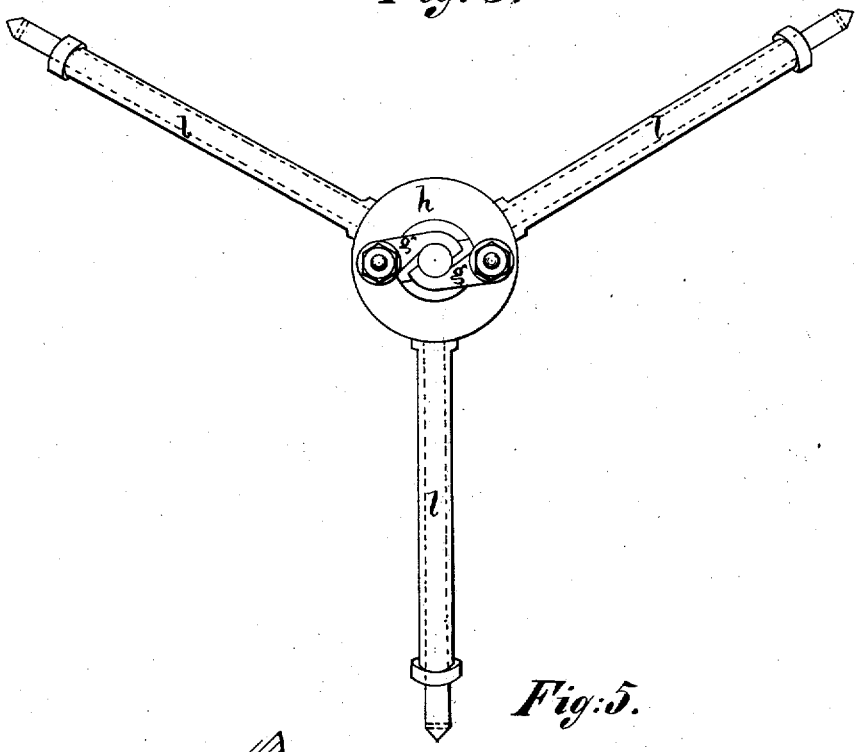
Figure 5:
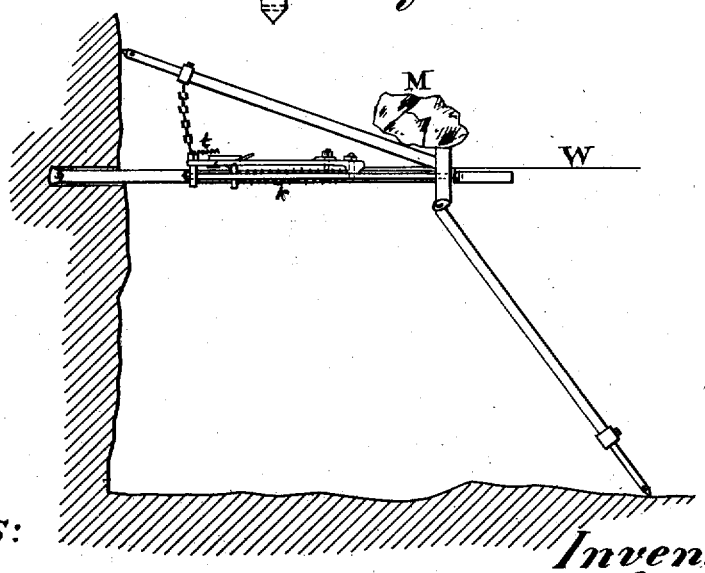
Figure 4:
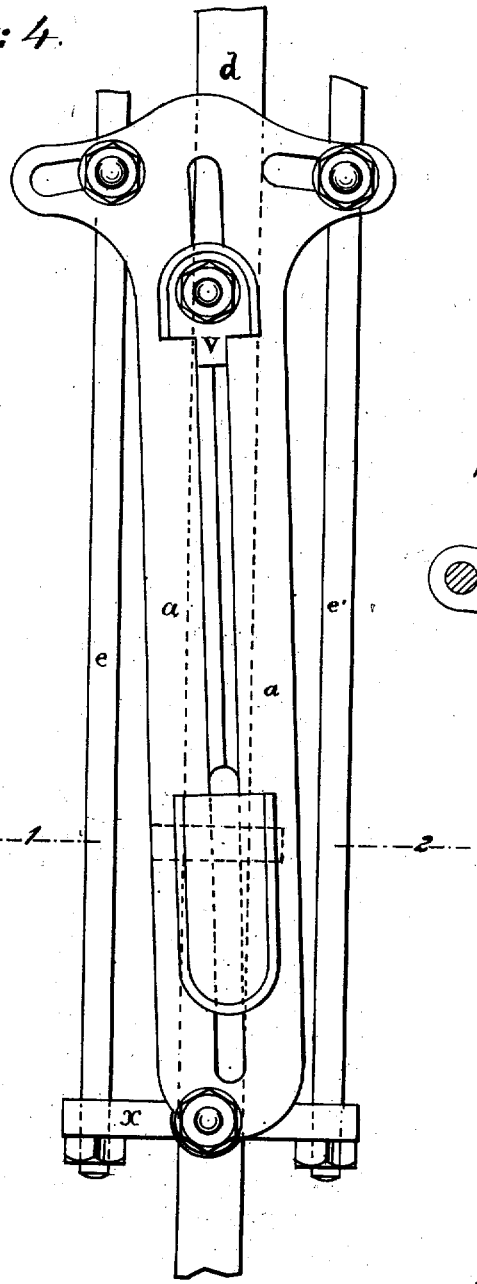
Figure 4:
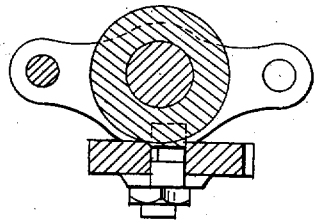

The accompanying drawings are as follows: Figures 1 and 2 are elevations, partly in section, exhibiting front and side views of the drill-bar and its centering and guiding mechanism and the tripod. Fig. 3 is a top view of the same. Fig. 4 is an enlarged front elevation of the apparatus for guiding, lifting, turning, and dropping the drill. Fig. 5 is a side elevation of the supporting-structure, as arranged to permit the drill-bar to work horizontally.

The tripod-head *h* is made of cast-iron or other suitable material, and may have on its upper surface two small hooks or guides, *g g*, to steady the upper end of the drill *d*. A second support or guide, at the lower end of the drill, is formed by the cross-piece *x*, which is supported by the rods *e e'*, and steadied by the chains *c*, $c^1$, and $c^2$. The legs of the tripod *l l l* have sliding or telescopic joints, as shown in the drawings, which admit of their being lengthened or shortened, as circumstances may require, and one or more of these legs is hinged at the top. They are provided with hooks *g* $g^1$ $g^2$, to which the chains may be attached. Each leg is provided with a hole, *n*, near the bottom, to receive a small iron pin, whereby detachable weights may be affixed to the structure, to give steadiness to the machine when the drill is in operation. These detachable weights serve a very important purpose. An apparatus that has incorporated into and made part of its own structure, sufficient weight of material to give it the requisite stability when in operation, is so heavy that it cannot be conveniently transported from place to place and adjusted in position.

In drilling in mines and other rock excavations it is often necessary to set the machine where the ground is uneven and rough, and the space limited and confined, and where only one or two men can be employed in placing or operating the drill. This makes it important, if not essential, that the apparatus shall be light and portable. I therefore employ several weights, and make provision for separately attaching them to or detaching them from the legs of the tripod.

When the machine is set for operation, it may be securely and conveniently anchored in position, and when it is to be moved it may be readily disencumbered of its supplementary weight and made portable, so that one or two men may take it up, carry it from place to place, and set it in position for operation.

A collar, *f*, is fastened to the drill by a key or set-screw, its lower surface being rough to prevent slipping on the catch or spring *s*, when the latter is lifted by the wire W. The spring *s* is attached to the slide *b*, and the latter guided in an oblique direction by the plate *a* as it is raised by the wire W. When the slide *b* has reached such a height that the spring comes in contact with the inclined surface *v*, it is turned from its course in such a way as to slide from under the collar *f* when the drill falls in a vertical direction. The drill is thus turned a certain distance each time it is lifted, and the rapidity of its rotation can be increased or diminished at pleasure, by changing the inclination of the plate *a*, as can easily be done by loosening the nuts at the upper end of the plate, and sliding the latter sidewise. The length of stroke is regulated in a similar manner, by setting the slide *v* at any desired point by means of the nut on its front side.

In order to use this machine in vertical drilling, the tripod is placed over the point where the hole is to be drilled, and, when necessary, weights are attached to the legs to secure stability. The legs having been adjusted to the proper length, and stretched apart as the case may require, are then prevented from further stretching apart by means of the chains $c\ c^1\ c^2$, as shown in Figs. 1 and 2. The collar $f$ is firmly secured to the drill just above the lowest point to which the slide $b$ will come. The drawings exhibit the drill-bar as being operated by means of the wire W, which is conducted on pulleys or otherwise, to a distant motor, and so attached to the latter as to be pulled and slackened alternately, the former motion having the effect of raising the drill until released, as before mentioned, and the latter allowing the slide to return and catch the collar for another blow. When it is desired to drill in a horizontal direction, or nearly so, the tripod may be placed, as shown in Fig. 5, a weight, M, being laid on, as shown, to give stability, a spiral spring, $k$, added to deliver the blow, and a second spring, $t$, added to bring back the slide after the drill has been released. The mechanism for centering and guiding the drill-bar is composed of the rods $e\ e'$, and the head $h$, and cross-piece $x$, which together constitute a centering and guiding bed for controlling the position of the reciprocating drill-bar. By means of this guiding-bed or drill-bar frame, and the adjustable tripod which supports it, the drill may be made to work in various directions.

I am aware that tripods of various kinds have been used in connection with rock-drills, but they have not been provided with hinged telescopic legs arranged so that the outward movement may be limited in prescribed degrees.

What I claim as my invention is—

1. The combination of telescopic legs, the same hinged at the tops and capable of lateral and vertical adjustment with a tripod-head, to which is secured mechanism for carrying and centering the drill-bar.

2. The combination of mechanism for centering and guiding a reciprocating drill-bar, with a tripod having telescopic legs hinged at the top, whereby such legs may be moved on their hinges outward from the axis of the drill-bar, and an adjustable device applied to the legs below their bearings, for limiting the outward movement of the legs in prescribed degrees, for the purpose of supporting the centering and guiding mechanism in variable positions.

3. The hooks $g^1\ g^2\ g^3$ attached to the telescopic leg of a tripod, for a rock-drill.

4. The combination of the collar $f$ with the guide-plates $a$, slide $b$ and $v$, and spring $s$, as and for the purpose described.

5. The combination of the springs K and $t$, Fig. 4, with the guide-plates $a$, slide $b$ and $v$, and spring $s$, substantially as and for the purpose described.

Witness my hand this 12th day of August, 1875.

W. R. KING.

Witnesses:
JAS. MERCUR,
SAML. STORER.